(12) United States Patent
Tamrakar et al.

(10) Patent No.: US 12,451,588 B2
(45) Date of Patent: Oct. 21, 2025

(54) COMMUNICATION DEVICE

(71) Applicant: Intel Corporation, Santa Clara, CA (US)

(72) Inventors: Maruti Tamrakar, Tamil-Nadu (IN); Prasanna Pichumani, Bangalore (IN); Jayprakash Thakur, Bangalore (IN); Sagar Gupta, Pradesh (IN)

(73) Assignee: Intel Corporation, Santa Clara, CA (US)

( * ) Notice: Subject to any disclaimer, the term of this patent is extended or adjusted under 35 U.S.C. 154(b) by 792 days.

(21) Appl. No.: 17/557,059

(22) Filed: Dec. 21, 2021

(65) Prior Publication Data

US 2023/0198122 A1 Jun. 22, 2023

(51) Int. Cl.
*H01Q 1/22* (2006.01)
*H04M 1/02* (2006.01)

(52) U.S. Cl.
CPC .......... *H01Q 1/2266* (2013.01); *H04M 1/026* (2013.01)

(58) Field of Classification Search
CPC ...... H01Q 1/2266; H01Q 21/065; H01Q 3/04; H04M 1/026
See application file for complete search history.

(56) References Cited

U.S. PATENT DOCUMENTS

| | | | |
|---|---|---|---|
| 9,964,995 B1* | 5/2018 | Morrison | H01Q 21/30 |
| 2009/0243949 A1* | 10/2009 | Takizawa | H01Q 3/06 |
| | | | 343/757 |
| 2012/0256801 A1 | 10/2012 | Shibohta | |
| 2017/0373375 A1 | 12/2017 | Bologna et al. | |
| 2021/0050664 A1* | 2/2021 | Lin | H01Q 1/273 |
| 2021/0111480 A1* | 4/2021 | Zhong | H01Q 1/2291 |
| 2021/0408685 A1* | 12/2021 | Chang | H01Q 5/371 |

FOREIGN PATENT DOCUMENTS

CN 111326845 A 6/2020

OTHER PUBLICATIONS

European Search Report issued for the corresponding European patent application No. 22201054, dated Apr. 18, 2023, 9 pages (for informational purposes only).

* cited by examiner

*Primary Examiner* — Christopher M Brandt
(74) *Attorney, Agent, or Firm* — Viering, Jentschura & Partner mbB

(57) ABSTRACT

A communication device including a chassis; and a wireless communication interface arranged at least in part on a mounting structure, wherein the chassis houses the wireless communication interface, wherein the wireless communication interface comprises an antenna; and wherein the chassis comprises a recess, and wherein the mounting structure is rotatably arranged in the recess.

20 Claims, 9 Drawing Sheets

COMMUNICATION DEVICE

TECHNICAL FIELD

This disclosure generally relates to communication devices having a wireless communication interface.

BACKGROUND

Laptop computers often include more than six antennas on a system base, and support different use case modes. One use case mode is the laptop mode that includes an open lid and/or clamshell. Most of the antennas support the laptop mode if placed on the lid of the laptop or base. However, the performance of the antennas, e.g. the efficiency, drops in a closed-lid mode, tablet mode and other use case scenario. The performance drop reduces throughput of wireless communications in those modes. Currently, there is no solution available to avoid a performance drop in closed-lid mode or tablet mode for 5th generation (5G) G antennas. As an example, the slot antenna design with C-cover (e.g. including cut-out portions for the keys of a keyboard) formed of full metal with a radiofrequency (RF) window in D-cover (lower cover beneath the C-cover and coupled to the C-Cover, e.g. C-cover and D-cover enclose a motherboard arranged on a chassis) is adapted for Wi-Fi only antennas. However, the Wi-Fi slot antenna performance still degrades in tablet mode.

Further, antenna performance is also challenging in narrow bezel and thin system design for different modes.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which.

DESCRIPTION

Figure 1A:
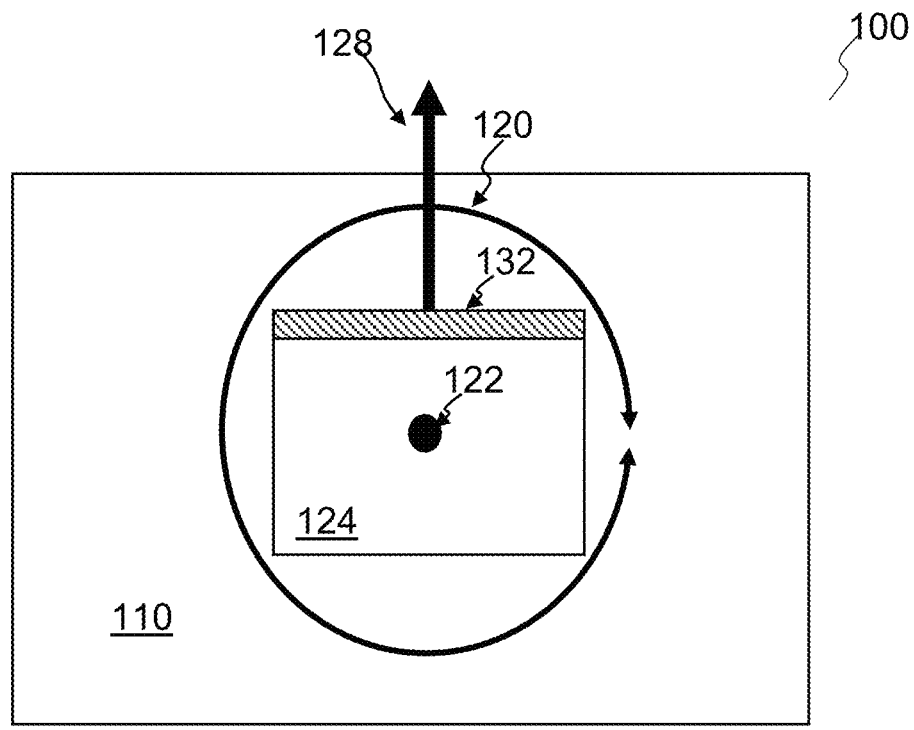
FIG. 1A to FIG. 1B illustrate exemplary schematic diagrams of a communication device.

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and electrical changes may be made without departing from the scope of the disclosure. The various aspects described herein are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa. Throughout the drawings, it should be noted that like reference numbers are used to depict the same or similar elements, features, and structures.

Illustratively, the antenna of a wireless communication interface is rotatably arranged in the chassis of the communication device, e.g. in a recess of the chassis. As an example, the communication device may be a laptop computer, and the chassis may include a C-cover and a D-cover as denoted in a conventional laptop computer. The C-cover and D-cover may cover (also denoted as housing or enclosing) the recess in which the antenna is rotatably arranged. The antenna can rotate in a direction of better signal strength or based on a use case mode of the communication device. Each use case mode may be associated with an angle of the display lid to the C-cover. Use case modes may include closed-lid mode, open lid mode or tablet mode, as an example. The antenna may rotate to different directions in closed-lid mode, open lid mode or tablet mode.

Thus, a performance of the wireless communication interface can be improved when rotating the antenna from a first direction to a second direction, or vice versa. Here, the performance may be any objective benchmark, e.g. received signal strength indication (RSSI), radio frequency interference (RFI), Specific Absorption Rate (SAR), signal to noise ratio (SNR).

A 5G-Sub 6 GHz antenna and Wi-Fi antenna is an omni-directional antenna. The radiation pattern of omni-directional antennas can change due with metal proximity, e.g. in case of a metal chassis. Thus, omni-directional antennas may radiate in a single direction (uni-directional). The antenna performance, e.g. impedance matching and efficiency, can also drop with metal in the proximity of the antenna. In closed-lid mode and tablet mode, the antennas come close to the chassis, and, thus, performance may degrade in a conventional laptop.

A 5G mmWave antenna can be a uni-directional antenna. A single rotational antenna can rotate to change the direction of the antenna radiation. Thus, a number of required mmWave antennas and cable requirement due to required 360° coverage can be reduced. Alternatively, or in addition, a cumulative distribution function (CDF) better than 0.5 can be achieved.

As an example, the following table summarizes an orientation of the antenna in different use case modes of a laptop computer as communication device.

| Use case | Display to C-Cover Angle | Antenna radiation/ Module direction |
| --- | --- | --- |
| Closed-lid Mode | 0° | D-Cover side |
| Open Lid Mode | 120° | C-Cover side |
| Tablet Mode | about 360° | C-Cover side |

This way, as an example, a 360-degree connectivity of the communication device is enabled. The antenna, e.g. directed away from the lid, can have an improved antenna performance in the tablet mode and/or closed lid mode.

The wireless communication interface may include a uni-directional antenna used for mmWave and Wi-Fi. Alternatively, or in addition, the wireless communication interface may include an omni-directional antenna for 5G communication in a sub-6 GHz frequency range. As an example, a single rotational antenna can rotate to change the direction of the antenna radiation.

The antenna may be connected with a hinge of the communication device coupling the display lid to the chassis via a rotation mechanism (also denoted as transmission). The antenna module may be arranged on a lid of the communication device, a left side of a keyboard and/or a right side of the keyboard.

The communication device may have the same design as a conventional communication device, e.g. input/output locations may be the same as in the conventional communication device. Further, conventional antenna designs may be used for the wireless communication interface. Illustratively, the antenna may be any antenna type of a conventional antenna, e.g. uni-directional antenna or omni-directional antenna.

The antenna may be co-located with a speaker of the communication device, e.g. in the recess of the chassis in which the speaker is arranged.

Thus, as an example, the rotatable antenna provides 360° coverage, and thus the number of antennas, e.g. mmWave antennas, and cables can be reduced.

The use case mode and/or the antenna direction may be determined using a sensor, e.g. a Hall-sensor. The antenna direction may be based on received signal strength indication (RSSI). The direction of the antenna may be changed to improved antenna performance.

The antenna may be arranged outside of the chassis, e.g. in a recess of the chassis. Hence, radio frequency interference (RFI) and/or noise performance and wireless throughput as antenna may be improved.

The antenna may improve the Specific Absorption Rate (SAR) performance for clamshell mode (open lid mode and/or closed lid mode) and tablet mode.

Based on sensor input, e.g. a Hall-sensor input, and based on an RSSI value (signal strength), the performance-drop can be avoided in different use case modes by rotating the antenna while gaining better wireless communication connectivity. Thus, wireless communication performance may improve in all the use case modes of thin and light communication devices. Further, the wireless communication performance of antennas may improve in areas with low signal strength.

Throughout this specification, a communication device may be a mobile phone, e.g., a smartphone, such as an iPhone, Android, Blackberry, etc., a Digital Enhanced Cordless Telecommunications ("DECT") phone, a landline phones, tablets, a media players, e.g., iPod, MP3 player, etc.), a computer, e.g., desktop or laptop, PC, Apple computer, etc.; an audio/video (NV) wireless communication terminal that can be part of a home entertainment or home theater system, for example, a car audio system or circuitry within the car, remote control, an accessory electronic device, a wireless speaker, or a smart watch, or a Cloud computing device.

Throughout this specification, an antenna may be configured as a short range mobile radio communication interface such as e.g. a Bluetooth interface, e.g. a Bluetooth Low Energy (LE) interface, Zigbee, Z-Wave, WiFi HaLow/IEEE 802.11ah, and the like. By way of example, one or more of the following Bluetooth interfaces may be provided: Bluetooth V 1.0A/1.0B interface, Bluetooth V 1.1 interface, Bluetooth V 1.2 interface, Bluetooth V 2.0 interface (optionally plus EDR (Enhanced Data Rate), Bluetooth V 2.1 interface (optionally plus EDR (Enhanced Data Rate), Bluetooth V 3.0 interface, Bluetooth V 4.0 interface, Bluetooth V 4.1 interface, Bluetooth V 4.2 interface, Bluetooth V 5.0 interface, Bluetooth V 5.1 interface, Bluetooth V 5.2 interface, Bluetooth V 5.3 interface and the like.

Throughout this specification, a rotatable antenna oriented in a first direction and in a second direction may include the same effective aperture and impedance. In other words, the antenna may be of a fixed size and/or form factor independent from the orientation of the first direction and the second direction. Thus, the antenna may be operational in each of the first direction and the second direction, and the antenna may be operational in the same frequency range in each of the first direction and the second direction. Antenna tuning parameters may be the same or different for the first direction and second direction, depending on the application.

Figure 1B:
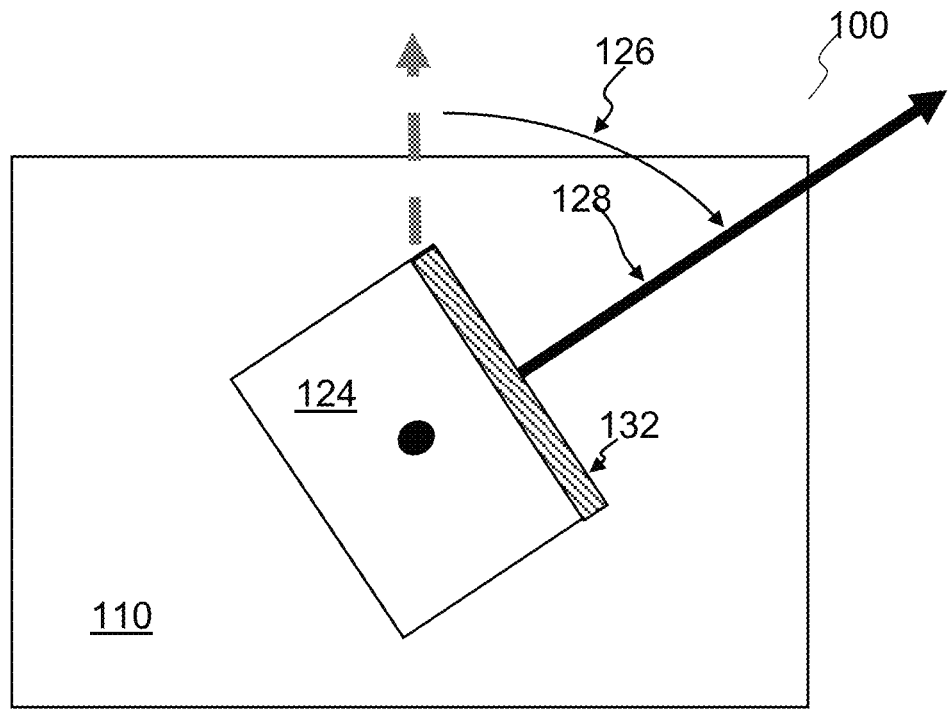

FIG. 1A and FIG. 1B schematically illustrate a mobile communication device 100. The mobile communication device 100 may include a chassis 110 and a wireless communication interface 132 arranged on a mounting structure 124. FIG. 1A illustrates a first direction of the communication interface 132 relative to the chassis 110, and FIG. 1B illustrates a second direction of the communication interface 132 relative to the chassis 110. The communication interface 132 is arranged in a recess of the chassis 110. The communication interface 132 may be arranged rotatably (in FIG. 1A illustrated by arrow 120) in the recess. As an example, the communication interface 132 may be coupled via a bearing 122 to the chassis 110. The communication interface 132 may be rotatable regarding a default position in a range from 0° to 360°+, e.g. freely rotatable without any stop. The default mode may be associated to a default use case mode, e.g. a laptop mode for a laptop computer as communication device 100. As an example, the communication interface 132 may be rotatable in a range from 0° to 180° regarding the default position.

Illustratively, the antenna in the first direction and in the second direction may include the same effective aperture and impedance. In other words, the antenna may be of a fixed size and/or form factor independent from the orientation of the first direction and the second direction. Thus, the antenna may be operational in each of the first direction and the second direction, and the antenna may be operational in the same frequency range in each of the first direction and the second direction. The antenna may use different antenna tuning parameters in the first direction and the second direction.

The communication interface 132 may include or may operate as a uni-directional transmitting antenna and/or uni-directional receiving antenna (in FIG. 1A illustrated by a first arrow 128). The second direction (FIG. 1B) may be offset by an angle (in FIG. 1B illustrated by a second arrow 126) regarding the first direction.

A change of direction of the mounting structure causing a rotation of the wireless communication interface 132 can enhance the field of view of coverage of the communication device and/or enhance the user experience on the device connectivity.

The communication interface 132 may include the antenna, an antenna module including the antenna, and/or an antenna exciter. At least one of these components is rotatably mounted on the mounting structure 124 to be rotatable in the recess of the chassis 110. The component of the wireless communication interface may be mounted eccentrically on the mounting structure 124.

The wireless communication interface 132 may further include a controller. The controller may be configured to determine a performance and/or orientation of the wireless communication interface 132 in the first direction. The controller may determine an antenna tuning parameter set associated with the orientation or the correlated use case mode to drive the antenna accordingly. Alternatively, or in addition, the controller may output an indication signal in case the performance drops below a predetermined threshold value. The chassis 110 may further include a light emitting component, e.g. a light emitting diode, configured to emit light when receiving the indication signal from the controller. Alternatively, or in addition, the mounting structure 124 may further include a motor configured to position the antenna from the first direction into the second direction when receiving the indication signal. Thus, an automated antenna rotation may be enabled, e.g. independent from a motion of the display lid. Alternatively, or in addition, the mounting structure 124 may be mechanically coupled to the display lid, e.g. in a predetermined transmission ratio. As an example, the antenna may rotate by an angle of 90° when the display lid rotates by an angle of 90° (also denoted as transmission ratio of 1:1). However, other transmission ratios may also be selected, e.g. a rotation of 90° of the antenna in case the display lid rotates 180° (transmission ratio of 1:0.5).

Figure 2A:
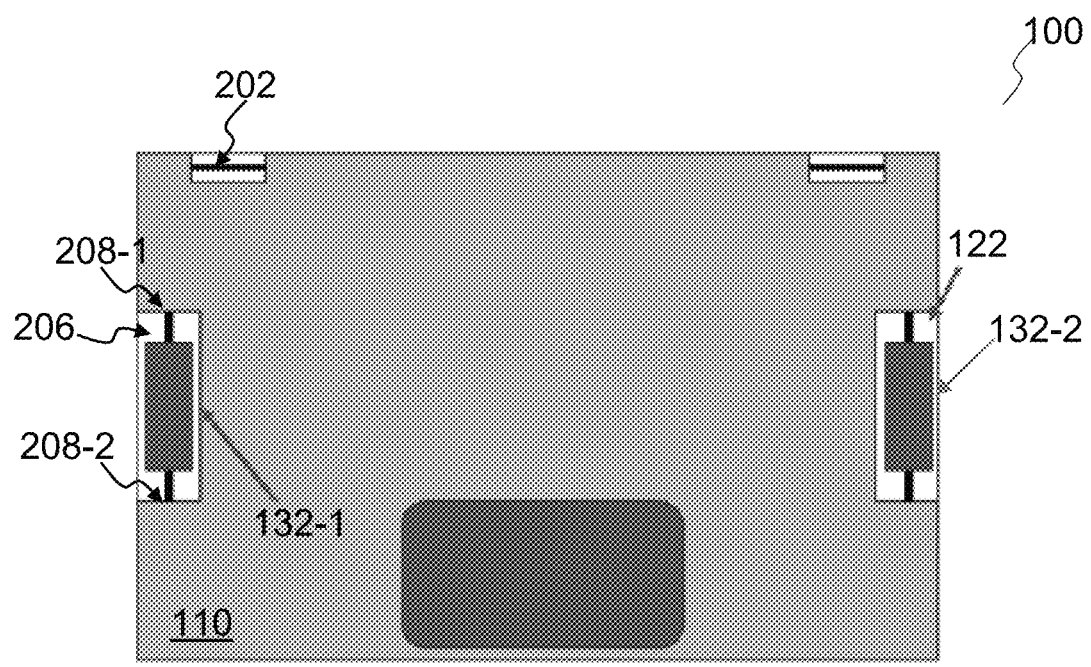
FIG. 2A to FIG. 2B illustrate exemplary schematic diagrams of a communication device.

Further, the mobile communication device 100 may include a rotatable first wireless communication interface 132-1 and a rotatable second wireless communication interface 132-2 (illustrated in FIG. 2A and FIG. 26). The first wireless communication interface 132-1 and the second wireless communication interface 132-2 may be arranged on different sides of the chassis 110. As an example, the first wireless communication interface 132-1 may be arranged on a slim side of the chassis 110, e.g. located next to one or more interface port(s), and the second wireless communication interface 132-2 may be arranged on an extensive side including a keypad. Alternatively, the first wireless communication interface 132-1 and the second wireless communication interface 132-2 may be arranged at different lateral sides of the chassis (as illustrated in FIG. 2A and FIG. 26). The wireless communication interface and the second wireless communication interface 132-2 may be configured for the same wireless communication protocols, or for different communication protocols. As an example, the wireless communication interface may be a 5G (5th generation) or 6G (6th generation) communication interface and the second wireless communication interface 132-2 may be a Wi-Fi interface, or vice versa. In other words, the antennas may be configured for communications having a frequency larger than 1 GHz.

The communication device 110 may be a laptop computer including a display lid and/or a keypad having a plurality of keys coupled to the chassis 110. As an example, the lid and the chassis 110 may be coupled to a hinge. The wireless communication interface 132 may be arranged in the proximity of the hinge, at a side of the hinge, in the hinge or a few centimeters displaced from the hinge.

As an example, the lid may be movably attached to the chassis 110. The lid may be movable within a moving range. Here, the wireless communication interface 132 may be arranged outside of the moving range of the lid. As an example, the wireless communication interface 132 may be arranged lateral, e.g. at a side, to the moving range of the lid.

Figure 2B:
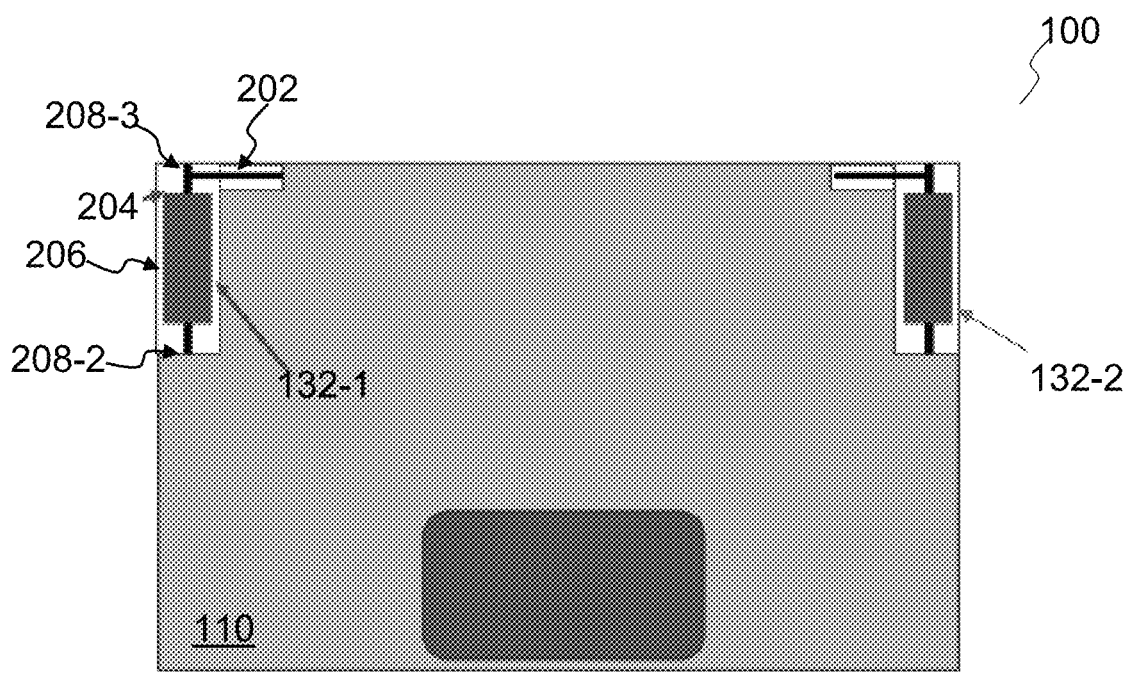

FIG. 2A illustrates a schematic top view of a first example of the communication device described before, and FIG. 2B illustrates a schematic top view of a second example of the communication device. In case of a laptop computer as the communication device 100, a C-cover may include a cut-out portion for the keys of the keyboard. A D-cover may be coupled to the C-cover. The C-cover and D-cover may enclose the chassis 110. Thus, C-cover and D-cover may also be denoted as housing, and the housing may house (also denoted as enclose) the chassis 110. The chassis 110 may include at least one recess 206 for rotatably mount a mounting structure having at least a part of a wireless communication interface 132-1, 132-2. Thus, in each recess 206, one or more wireless communication interface 132-1, 132-2 may be rotatably arranged, e.g. via a respective mounting structure (not illustrated in FIG. 2A and FIG. 26). The mounting structure may be rotatably coupled to the chassis 110, e.g. at a first section 208-1 and a second section 208-2. Alternatively, or in addition, the mounting structure may be rotatably coupled to a lid at a third section 208-3, as described below. The housing may enclose the chassis 110, the mounting structure, and the wireless communication interface 132-1, 132-2. The chassis 110 may be any kind of metal structure configured to mount a plurality of components of the communication device 100, e.g. at least the mounting structure including the wireless communication interface 132-1, 132-2, and a mainboard (also denoted as motherboard). The mainboard may include an antenna module of wireless communication interface 132-1, 132-2 coupled to an antenna on the mounting structure. In FIG. 2A and FIG. 2B, only one wireless communication interface 132-1, 132-2 per recess 206 is illustrated. However, this only an illustrative example, and two or more wireless communication interfaces 132-1, 132-2 may be arranged in a common recess, and/or on a common mounting structure.

In the first example, at least one wireless communication interface 132-1, 132-2 is rotatably arranged in a recess 206 of the chassis 110, and in the second example, the at least one wireless communication interface 132-1, 132-2 is coupled via a transmission 204 to a hinge 202 of the communication device 100. A display lid may be coupled via the hinge 202 to the chassis 110. A rotation of the lid may cause via the transmission 204 a rotation of the communication interface 132-1, 132-2 from a first direction to a second direction, as described above.

The transmission 204, e.g. a gear system, may be used for rotating the mounting structure 124 carrying at least a part of the wireless communication interface, e.g. the antenna. The rotation mechanism of the transmission 204 can relate to a hinge of the communication device. The mounting structure 124 may rotate in a direction to improve the signal strength of the wireless communication interface. The mounting structure 124 can also be rotated based on the use case mode of the communication device.

Figure 3:
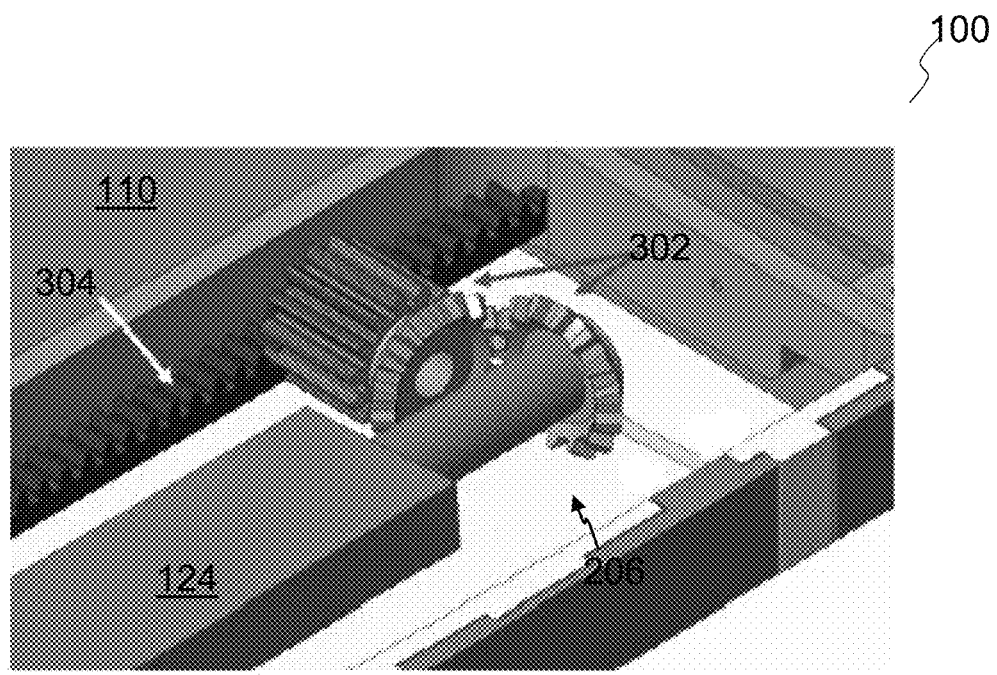
FIG. 3 illustrates exemplary schematic diagrams of a communication device.
Figure 4A:
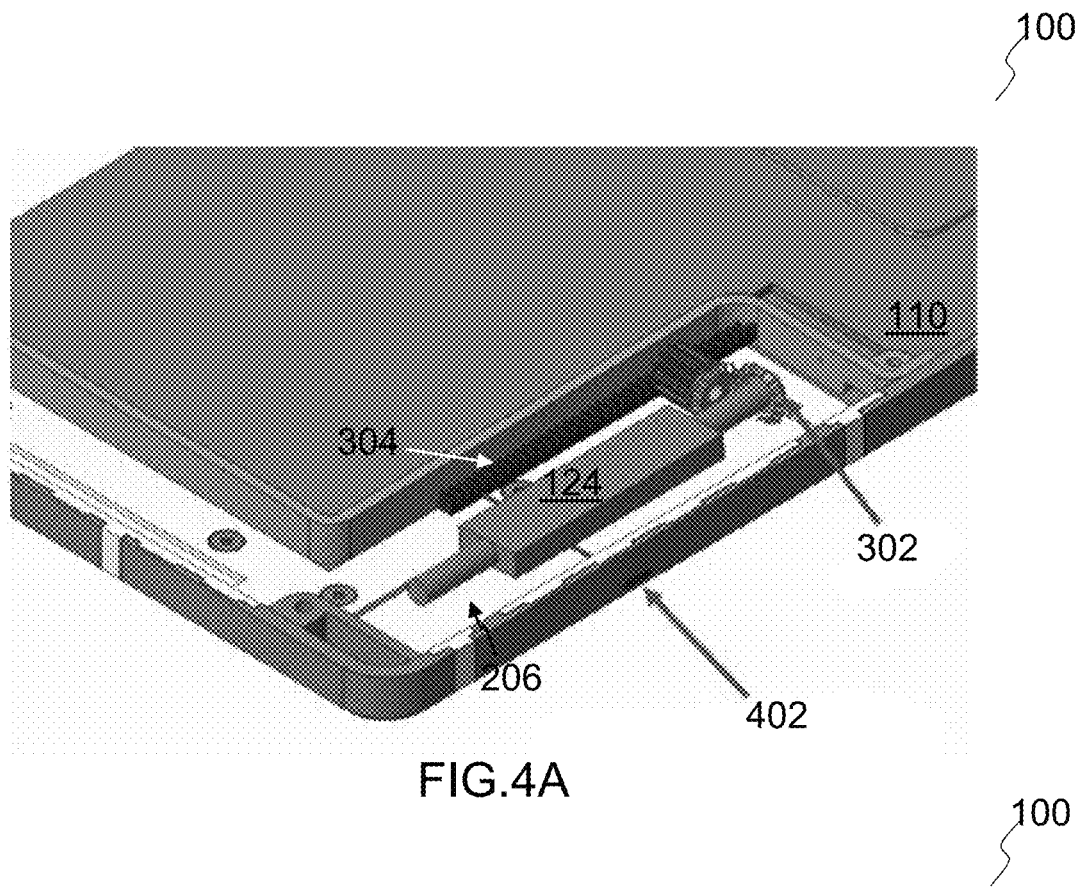
FIG. 4A to FIG. 4B illustrate exemplary schematic diagrams of a communication device.
Figure 4B:
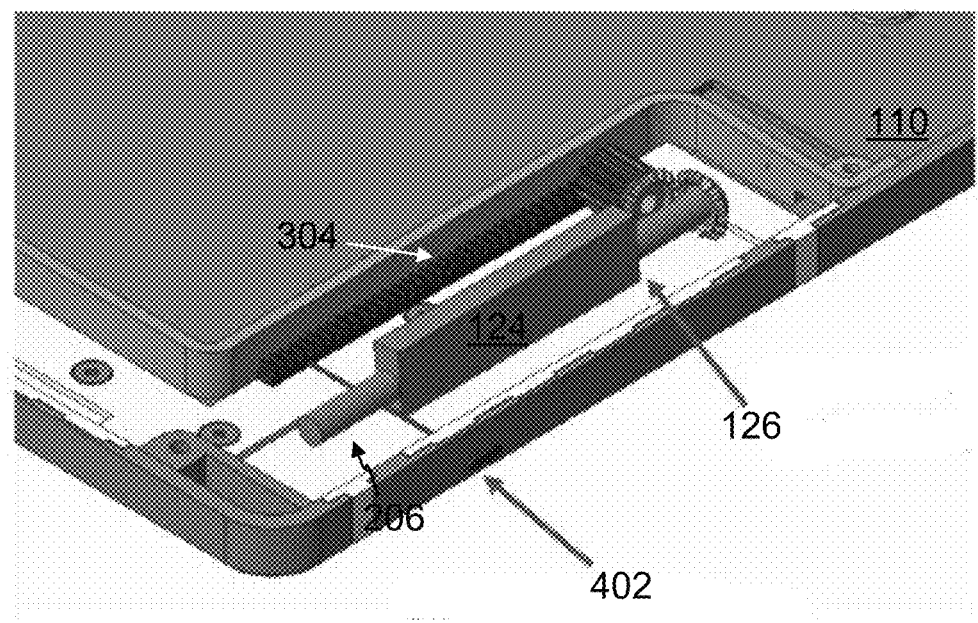

FIG. 3 to FIG. 4B illustrate an implementation of the first example illustrated in FIG. 2A. Here, the communication interface 132 may be coupled via a bevel gear 302 to a rack and pinion gear 304. The rack and pinion gear 304 may be coupled to a slideable switch (also denoted as bar) 402 (see FIG. 4A and FIG. 46). Thus, a sliding of switch 402 may cause a rotation of the communication interface 132, e.g. FIG. 4A illustrating a first direction and FIG. 4B illustrating a second direction. A user of the communication device can adjust the antenna performance by sliding the switch 402. This way, the mounting structure rotates the antenna into a direction having an improved performance.

The antenna may be arranged inside a recess 206 of the chassis 110, e.g. enclosed between a C-cover and a D-cover of a laptop computer as the communication device. The slideable switch 402 is accessible to the user, e.g. visible from the outside of the communication device 100. The slideable switch 402 is attached to the rack and pinion gear 304 on one side and the other side of the rack and pinion gear 304 is attached to a bevel gear. The other side of this bevel gear is attached to the mounting structure 124. When the user starts sliding the switch 402, the rack and pinion gear 304 moves and it activates the bevel gear, and, thus, the mounting structure rotates the antenna rotates.

Figure 5:
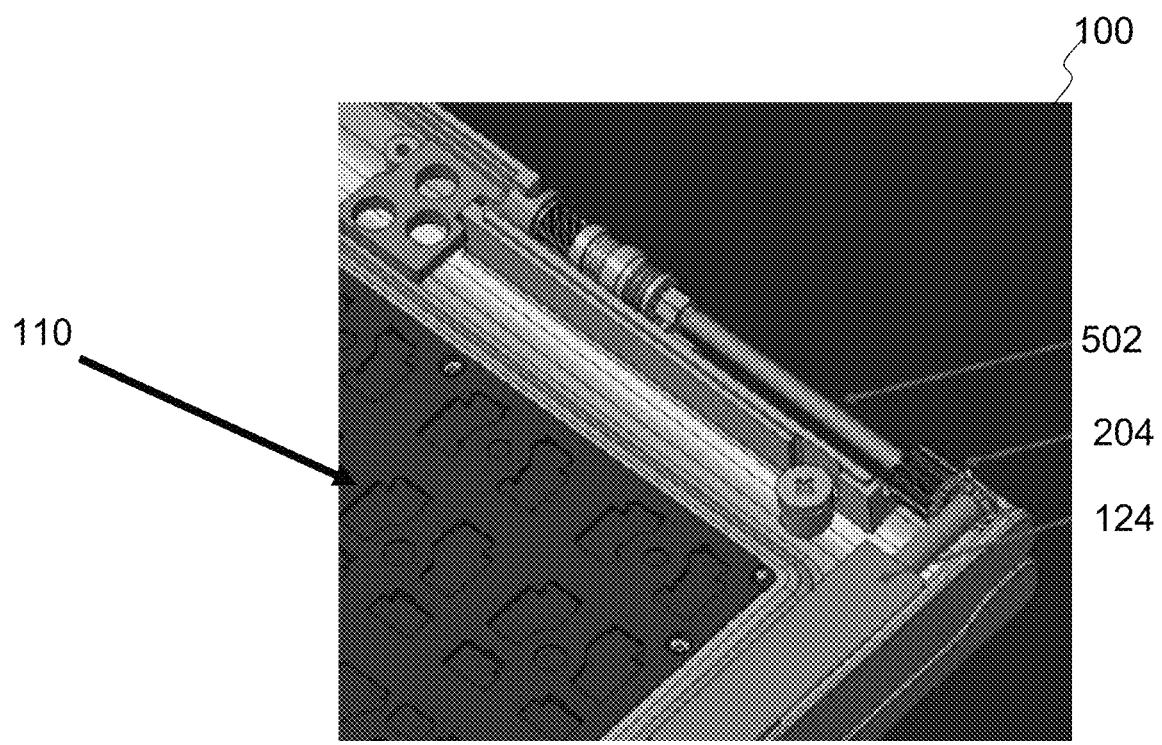
FIG. 5 illustrates exemplary schematic diagrams of a communication device.
Figure 6A:
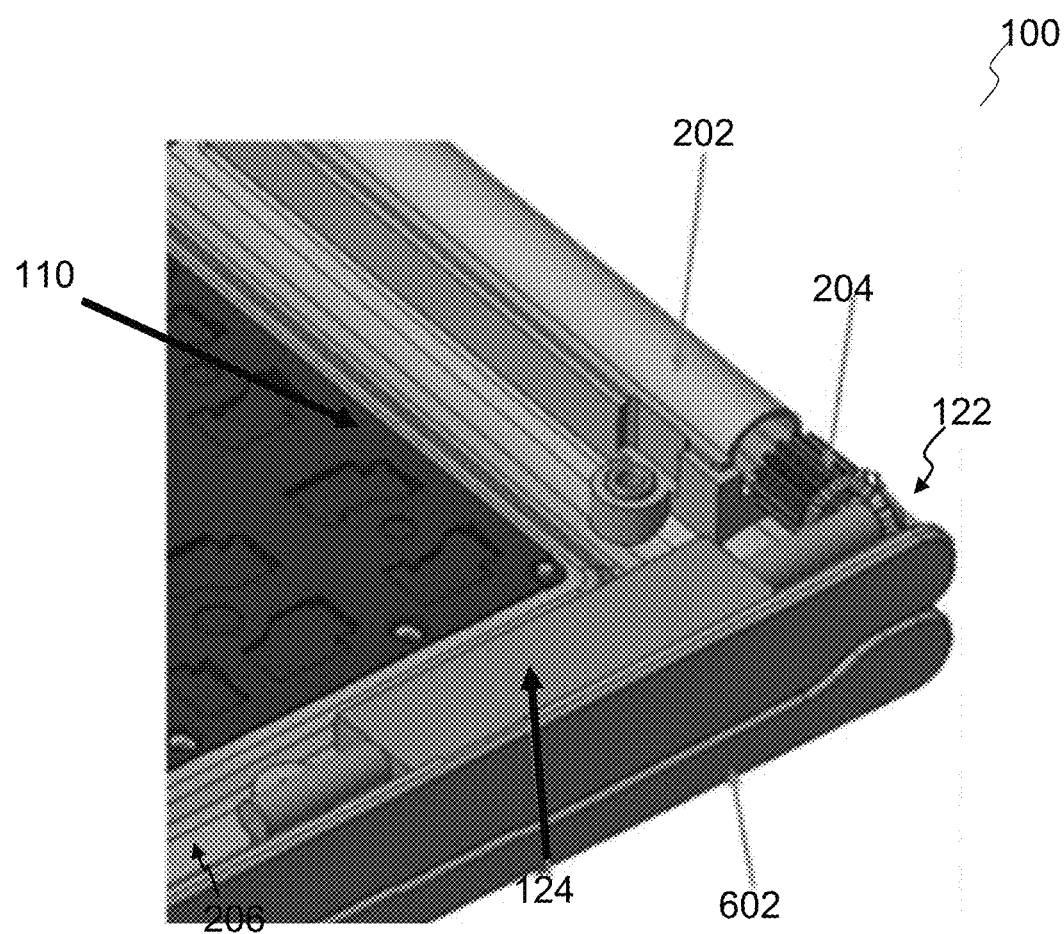
FIG. 6A to FIG. 6C illustrate exemplary schematic diagrams of a communication device.
Figure 6B:
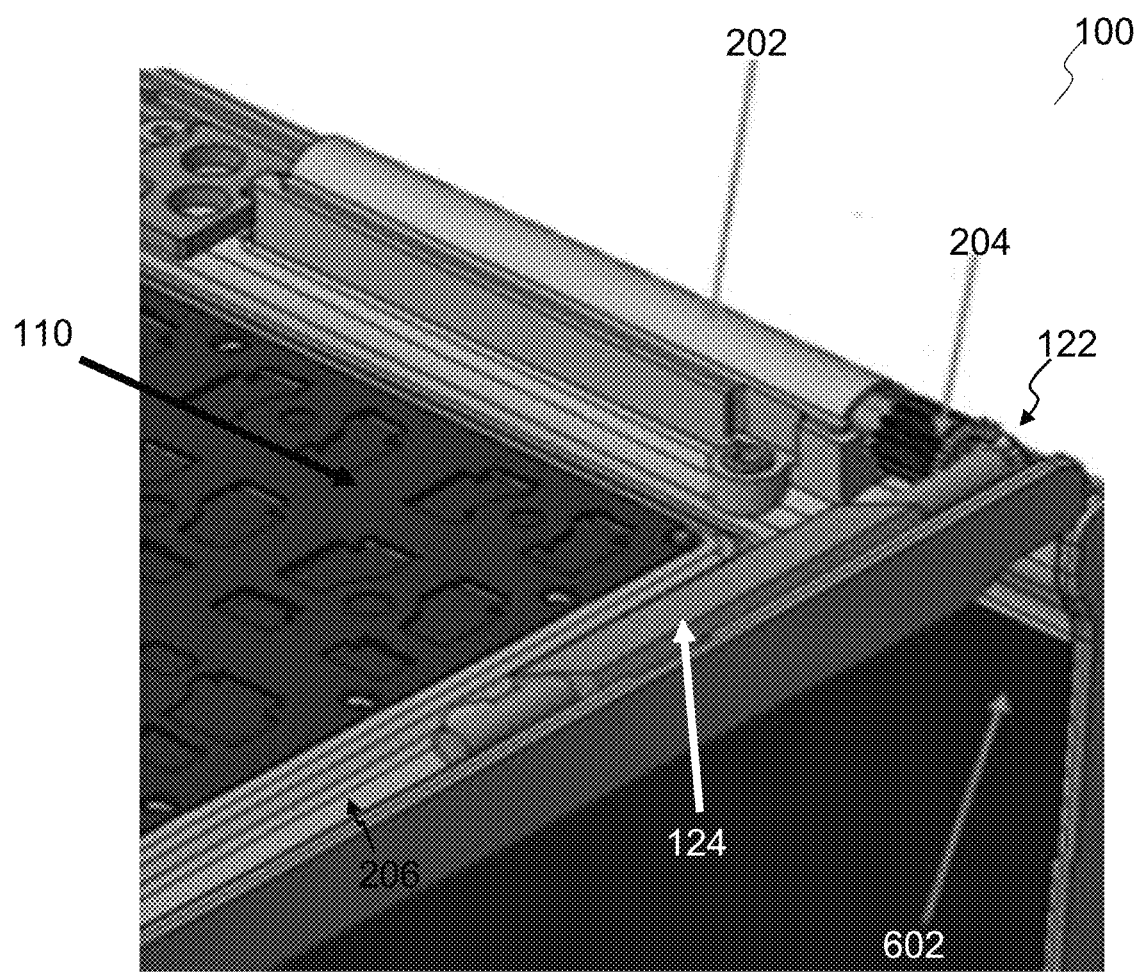
Figure 6C:
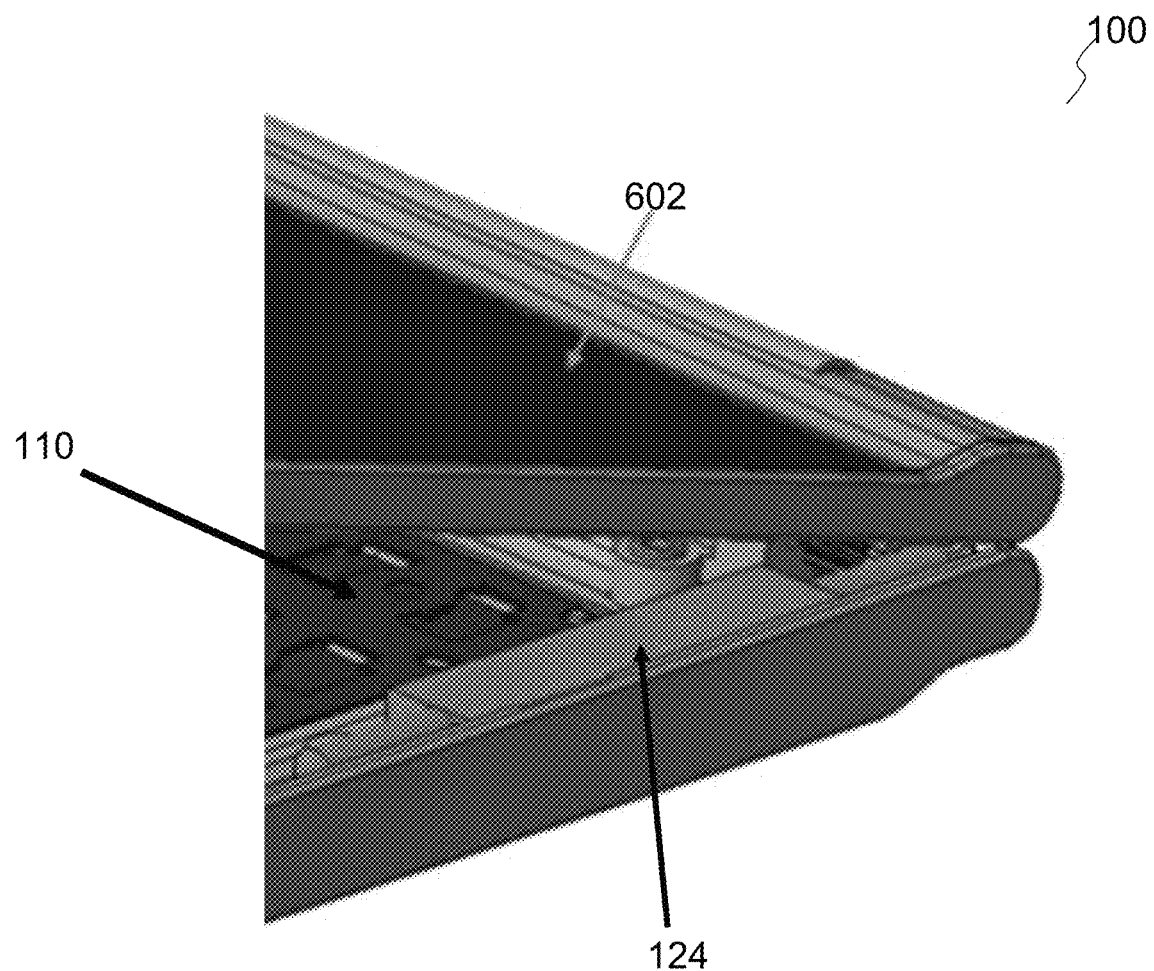

FIG. 5 to FIG. 6C illustrate an implementation of the second example illustrated in FIG. 2B. Here, the communication interface 132 may be coupled via a hinge mandrel 502 to the transmission 204, e.g. a gear 204, in the hinge 202. Thus, when rotating the display lid 602 coupled via the hinge 202 to the chassis 110, the mandrel 502 and the transmission 204 transmit the rotation to the mounting structure 124. Thus, the communication interface 132 may rotate from a first direction (FIG. 6A or FIG. 6B) to a second direction (FIG. 6B or FIG. 6C) by rotating the display lid 602. Thus, similar to the first example, the bevel gear of the mounting structure 124 may be coupled to the hinge mandrel 502 in the second example. This way, when the hinge is rotated the antenna also rotates.

The orientation of the display may be associated to one of a plurality of use case modes, like clamshell mode, closed mode, tablet mode. Thus, when the user changes the display orientation the antenna rotates and changes its direction.

As an example, FIG. 6A may illustrate a first use case mode of the communication device. As an example, the communication device 110 being a laptop computer, the first use case mode may be a lid closed mode. FIG. 6B may illustrate a second use case mode of the laptop 110. As an example, the second use case mode may be a laptop clamshell mode, having an opened display lid. FIG. 6C may illustrate a third use case mode of the laptop 110. As an example, the third use case mode may be a tablet mode.

Thus, referring to FIG. 1A to FIG. 6C, the communication device 100 may include a chassis 110 (also denoted as housing or enclosure); and a wireless communication interface 132 arranged at least in part on a mounting structure 124, wherein the chassis 110 houses the wireless communication interface 132, wherein the wireless communication interface 132 may include an antenna; and wherein the chassis 110 may include a recess 206. The mounting structure 124 may be rotatably arranged in the recess. The recess 206 may be covered by a housing, e.g. the C-cover and D-cover in a laptop computer as the communication device 100.

The communication device 100 may be a laptop computer supporting a plurality of use case modes associated to different lid 602 positions and different wireless communication interface directions 128.

The mounting structure 124 may be configured to arrange the wireless communication interface 132 in a first direction and in at least a second direction, wherein the second direction may be offset by an angle 126 to the first direction. The wireless communication interface 132 may include an uni-directional antenna. The antenna may be operational in the same frequency range in each of the first direction and the second direction. The mounting structure 124 may carry an antenna of the wireless communication interface 132. Alternatively, or in addition, the mounting structure 124 may include an antenna module of the wireless communication interface 132. Alternatively, or in addition, the mounting structure 124 may include an antenna exciter of the wireless communication interface 132.

The communication device 100 may include a controller configured to determine a direction 128 of the mounting structure 124. Alternatively, or in addition, a controller may be configured to determine a performance of the wireless communication interface 132 in the first direction, and to output an indication signal in case the performance drops below a predetermined threshold value.

The chassis 110 may enclose (also denoted as house) the wireless communication interface 132. The chassis 110 may include or may be formed of a metal.

A motherboard may be enclosed by the chassis 110, and the wireless communication interface 132 may include an antenna module, wherein the antenna module is arranged on the motherboard and coupled to the antenna.

The slideable switch 402 may be coupled to the mounting structure 124, and configured to rotate the mounting structure 124 within the chassis 110. The slideable switch 402 may be externally accessible. Alternatively, or in addition, the communication device 100 may include a hinge 202 and a lid 602, wherein the lid 602 and the chassis 110 are coupled to the hinge 202. Here, the mounting structure 124 may be coupled to the hinge 202. As an example, the lid 602 may be coupled to hinge mandrel 502 and the transmission 204 is coupled to the hinge mandrel 502 and the mounting structure 124.

Figure 7:
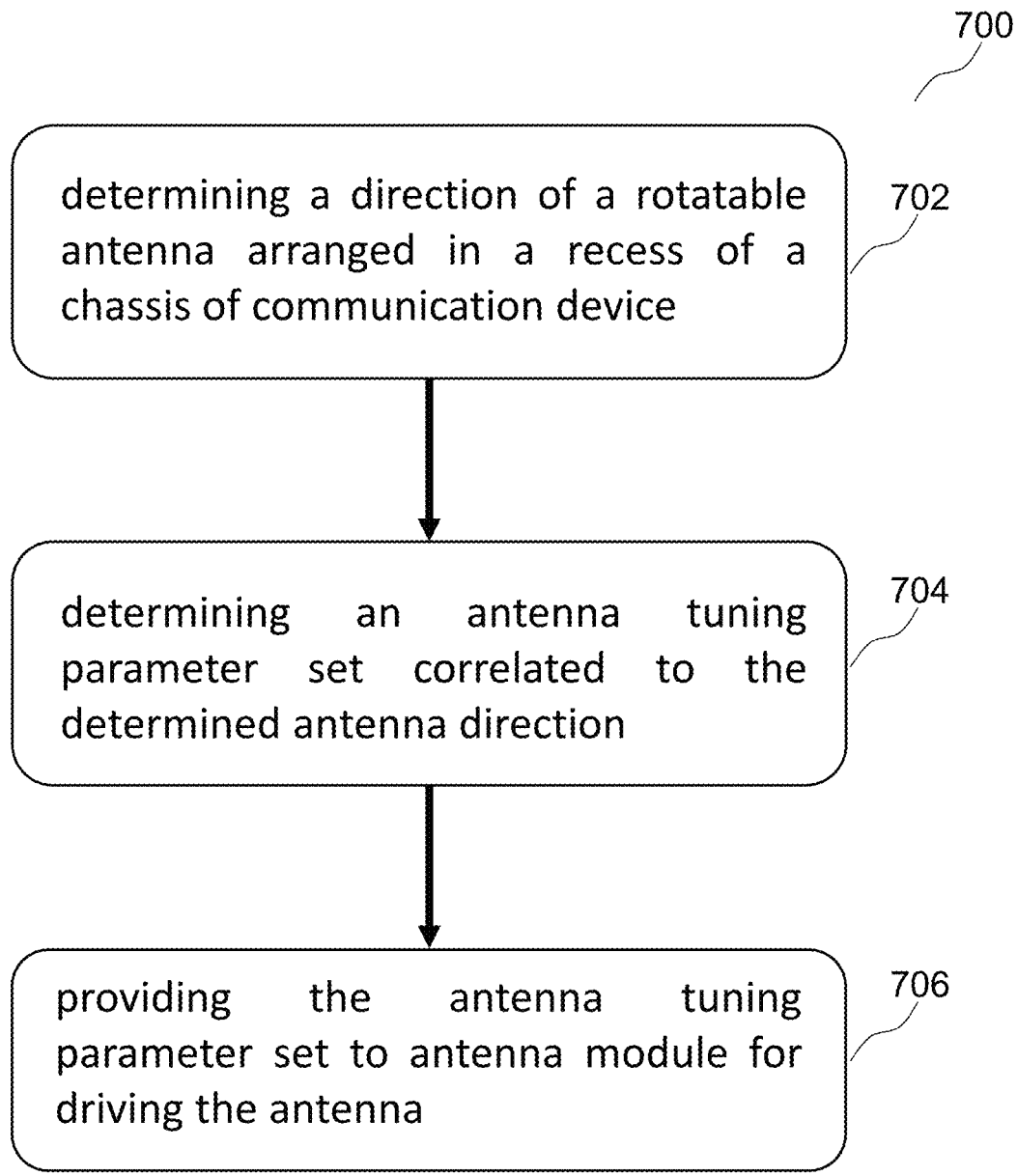
FIG. 7 illustrates an exemplary flow chart of a method to operate the communication device.

FIG. 7 illustrates a flow chart of a method to operate a communication device as described above. The method 700 may include determining 702 a (wireless) performance of a wireless communication interface in a first direction, and providing 704 an indication signal in case the performance drops below a predetermined threshold value. The indication signal may be provided 706 to a light emitting component configured to emit a light when receiving the indication signal and/or operating system (OS) notification and/or to a motor configured to position the antenna in the second direction when receiving the indication signal.

The mounting structure may be configured to arrange the antenna in a first direction (as illustrated in FIG. 1A) and in at least a second direction (as illustrated in FIG. 1B). In the first direction the antenna may be arranged in a first direction to a surface 112 of the chassis 110, and in the second direction the antenna may be arranged in a second direction to the surface 112 of the chassis 110. The surface 112 may be or include an edge of the chassis 110. The second direction may be larger than the first direction—in FIG. 1B illustrated by the offset 130. The first direction and the second direction may be determined based on a position of a surface 128 of the antenna relative to a surface 112 of the chassis 110.

The chassis 110 may include a recess (also denoted as cut out section) in which the communication interface 132 is arranged. In other words, the communication interface 132 is mechanically protected from the outside.

As an example, in case the chassis is formed of an electrically conductive material, e.g. a metal chassis, the chassis 110 may block or absorb a portion of the signals transmitted or received by the antenna in the first direction, but not in the second direction. Thus, the antenna in the second direction may have a better (wireless) performance than in the first direction.

Alternatively, or in addition, the method may include a determining of a direction of a rotatable antenna arranged in a recess of a chassis of communication device; determining an antenna tuning parameter set correlated to the determined antenna direction; and providing the antenna tuning parameter set to antenna module for driving the antenna. A look up table may provide the antenna tuning parameter set.

EXAMPLES

The examples set forth herein are illustrative and not exhaustive.

Example 1 is a communication device including a chassis; and a wireless communication interface arranged at least in part on a mounting structure, wherein the chassis houses the wireless communication interface, wherein the wireless communication interface includes an antenna; and wherein the chassis includes a recess, and wherein the mounting structure is rotatably arranged in the recess.

In Example 2, the subject matter of Example 1 can optionally include that the mounting structure is configured to arrange the wireless communication interface in a first direction and in at least a second direction, wherein the second direction is offset by an angle to the first direction.

In Example 3, the subject matter of Example 1 or 2 can optionally include that the chassis encloses the wireless communication interface.

In Example 4, the subject matter of any one of Example 1 to 3 can optionally include that the wireless communication interface includes a uni-directional antenna.

In Example 5, the subject matter of Example 4 can optionally include that the antenna is operational in the same frequency range in each of the first direction and the second direction.

In Example 6, the subject matter of any one of Example 1 to 5 can optionally include that the chassis includes or is formed of a metal.

In Example 7, the subject matter of any one of Example 1 to 6 can optionally further include a slideable switch coupled to the mounting structure, and configured to rotate the mounting structure within the chassis.

In Example 8, the subject matter of Example 7 can optionally include that the slideable switch is externally accessible.

In Example 9, the subject matter of any one of Example 1 to 8 can optionally further include a hinge and a lid, wherein the lid and the chassis are coupled to the hinge.

In Example 10, the subject matter of Example 9 can optionally include that the mounting structure is coupled to the hinge.

In Example 11, the subject matter of any one of Example 1 to 10 can optionally further include a transmission and a hinge mandrel, wherein the lid is coupled to hinge mandrel and the transmission is coupled to the hinge mandrel and the mounting structure.

In Example 12, the subject matter of any one of Example 1 to 11 can optionally further include a controller configured to determine a performance of the wireless communication interface in the first direction, and to output an indication signal in case the performance drops below a predetermined threshold value.

In Example 13, the subject matter of any one of Example 1 to 12 can optionally further include a controller configured to determine a direction of the mounting structure.

In Example 14, the subject matter of any one of Example 1 to 13 can optionally include that the mounting structure includes an antenna of the wireless communication interface.

In Example 15, the subject matter of any one of Example 1 to 13 can optionally include that the mounting structure includes an antenna module of the wireless communication interface.

In Example 16, the subject matter of any one of Example 1 to 13 can optionally include that the mounting structure includes an antenna exciter of the wireless communication interface.

In Example 17, the subject matter of any one of Example 1 to 16 can optionally include that the communication device is a laptop computer.

In Example 18, the subject matter of any one of Example 1 to 17 can optionally further include that a motherboard enclosed by the chassis, and wherein the wireless communication interface includes an antenna module, wherein the antenna module is arranged on the motherboard and coupled to the antenna.

Example 19 is a communication means including a chassis having a recess portion for rotatably housing a mounting means; the mounting means for mounting at least a part of a wireless communication means, wherein the chassis encloses the wireless communication means, wherein the wireless communication means includes an antenna.

In Example 20, the subject matter of Example 19 can optionally include that the mounting means is configured to arrange the wireless communication means in a first direction and in at least a second direction, wherein the second direction is offset by an angle to the first direction.

In Example 21, the subject matter of Example 19 or 20 can optionally include that the chassis encloses the wireless communication means.

In Example 22, the subject matter of any one of Example 19 to 21 can optionally include that the wireless communication means includes an uni-directional antenna.

In Example 23, the subject matter of Example 22 can optionally include that the antenna is operational in the same frequency range in each of the first direction and the second direction.

In Example 24, the subject matter of any one of Example 19 to 23 can optionally include that the chassis includes or is formed of a metal.

In Example 25, the subject matter of any one of Example 19 to 24 can optionally further include a slideable switch coupled to the mounting means, and configured to rotate the mounting means within the chassis.

In Example 26, the subject matter of Example 25 can optionally include that the slideable switch is externally accessible.

In Example 27, the subject matter of any one of Example 19 to 26 can optionally further include a hinge and a lid, wherein the lid and the chassis are coupled to the hinge.

In Example 28, the subject matter of Example 27 can optionally include that the mounting means is coupled to the hinge.

In Example 29, the subject matter of any one of Example 19 to 28 can optionally further include a transmission and a hinge mandrel, wherein the lid is coupled to hinge mandrel and the transmission is coupled to the hinge mandrel and the mounting means.

In Example 30, the subject matter of any one of Example 19 to 29 can optionally further include a controller configured to determine a performance of the wireless communication means in the first direction, and to output an indication signal in case the performance drops below a predetermined threshold value.

In Example 31, the subject matter of any one of Example 19 30 can optionally further include a controller configured to determine a direction of the mounting means.

In Example 32, the subject matter of any one of Example 19 to 30 can optionally include that the mounting means includes an antenna of the wireless communication means.

In Example 33, the subject matter of any one of Example 19 to 30 can optionally include that the mounting means includes an antenna module of the wireless communication means.

In Example 34, the subject matter of any one of Example 19 to 30 can optionally include that the mounting means includes an antenna exciter of the wireless communication means.

In Example 35, the subject matter of any one of Example 19 to 34 can optionally include that the communication device is a laptop computer.

In Example 36, the subject matter of any one of Example 19 to 35 can optionally further include that a motherboard enclosed by the chassis, and wherein the wireless communication means includes an antenna module, wherein the antenna module is arranged on the motherboard and coupled to the antenna.

Example 37 is a non-transitory computer readable medium including instructions which, if executed by one or more processors, cause the one or more processors to: determine a direction of a rotatable antenna arranged in a recess of a chassis of communication device; determine an antenna tuning parameter set correlated to the determined antenna direction; and provide the antenna tuning parameter set to antenna module for driving the antenna.

In Example 38, the subject matter of Example 37 can optionally include a look up table providing the antenna tuning parameter set.

The word "exemplary" is used herein to mean "serving as an example, instance, or illustration." Any example or design described herein as "exemplary" is not necessarily to be construed as preferred or advantageous over other examples or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

The terms "processor" or "controller" as, for example, used herein may be understood as any kind of technological entity that allows handling of data. The data may be handled according to one or more specific functions that the processor or controller execute. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "connected" can be understood in the sense of a (e.g. mechanical and/or electrical), e.g. direct or indirect, connection and/or interaction. For example, several elements can be connected together mechanically such that they are physically retained (e.g., a plug connected to a socket) and electrically such that they have an electrically conductive path (e.g., signal paths exist along a communicative chain).

While the above descriptions and connected figures may depict electronic device components as separate elements, skilled persons will appreciate the various possibilities to combine or integrate discrete elements into a single element. Such may include combining two or more components from a single component, mounting two or more components onto a common chassis to form an integrated component, executing discrete software components on a common processor core, etc. Conversely, skilled persons will recognize the possibility to separate a single element into two or more discrete elements, such as splitting a single component into two or more separate component, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A communication device comprising:
   a chassis;
   a hinge and a lid, wherein the lid and the chassis are coupled to the hinge;
   a transmission and a hinge mandrel, wherein the lid is coupled to the hinge mandrel and the transmission is coupled to the hinge mandrel and a mounting structure;
   a wireless communication interface arranged at least in part on the mounting structure, wherein the chassis houses the wireless communication interface; and
   a controller configured to determine an antenna tuning parameter based on a position of the lid,
   wherein the mounting structure is coupled to the hinge,
   wherein the transmission is configured to cause a rotation of the wireless communication interface, based on the antenna tuning parameter,
   wherein the wireless communication interface comprises an antenna; and
   wherein the chassis comprises a recess, and wherein the mounting structure is rotatably arranged in the recess.

2. The communication device of claim 1, wherein the mounting structure is configured to arrange the wireless communication interface in a first direction and in at least a second direction, wherein the second direction is offset by an angle to the first direction.

3. The communication device of claim 1, wherein the chassis encloses the wireless communication interface.

4. The communication device of claim 1, wherein the wireless communication interface comprises a uni-directional antenna.

5. The communication device of claim 2, wherein the antenna is operational in a same frequency range in each of the first direction and the second direction.

6. The communication device of claim 1, wherein the chassis comprises or is formed of a metal.

7. The communication device of claim 1, further comprising a slideable switch coupled to the mounting structure, and configured to rotate the mounting structure within the chassis.

8. The communication device of claim 7, wherein the slideable switch is externally accessible.

9. The communication device of claim 2, further comprising a controller configured to determine a performance of the wireless communication interface in the first direction, and to output an indication signal in case the performance drops below a predetermined threshold value.

10. The communication device of claim 1, further comprising a controller configured to determine a direction of the mounting structure.

11. The communication device of claim 1, wherein the mounting structure comprises an antenna of the wireless communication interface.

12. The communication device of claim 1, wherein the mounting structure comprises an antenna module of the wireless communication interface.

13. The communication device of claim 1, wherein the mounting structure comprises an antenna exciter of the wireless communication interface.

14. The communication device of claim 1, wherein the communication device is a laptop computer.

15. The communication device of claim 1, further comprising a motherboard enclosed by the chassis, and wherein the wireless communication interface comprises an antenna module, wherein the antenna module is arranged on the motherboard and coupled to the antenna.

16. A communication means comprising:
a chassis having a recess portion for rotatably housing a mounting means;
a hinge and a lid, wherein the lid and the chassis are coupled to the hinge;
a transmission and a hinge mandrel, wherein the lid is coupled to the hinge mandrel and the transmission is coupled to the hinge mandrel and the mounting means;
a wireless communication means arranged at least in part on the mounting means; and
a controller configured to determine an antenna tuning parameter based on a position of the lid,
wherein the mounting means is coupled to the hinge,
wherein the transmission is configured to cause a rotation of the wireless communication means, based on the antenna tuning parameter,
wherein the chassis encloses the wireless communication means, and
wherein the wireless communication means comprises an antenna.

17. The communication means of claim 16, wherein the mounting means is configured to arrange the wireless communication means in a first direction and in at least a second direction, wherein the second direction is offset by an angle to the first direction.

18. The communication means of claim 17, wherein the antenna is operational in the same frequency range in each of the first direction and the second direction.

19. A non-transitory computer readable medium comprising instructions which, when executed by one or more processors, cause the one or more processors to:
determine a position of a lid of a communication device, wherein the lid and a chassis of the communication device are coupled to a hinge by a transmission and a hinge mandrel, wherein the lid is coupled to the hinge mandrel and the transmission is coupled to the hinge mandrel and a mounting means;
determine a direction of a rotatable antenna arranged in a recess of a chassis of communication device;
determine an antenna tuning parameter set correlated to the determined antenna direction, based on the position of the lid; and
provide the antenna tuning parameter set to antenna module for driving the antenna; and
cause a rotation of the rotatable antenna, based on the antenna tuning parameter.

20. The non-transitory computer readable medium of claim 19, wherein a look up table provides the antenna tuning parameter set.

* * * * *